April 2, 1940.  W. BRAUER  2,195,764
VALVE
Filed May 10, 1938
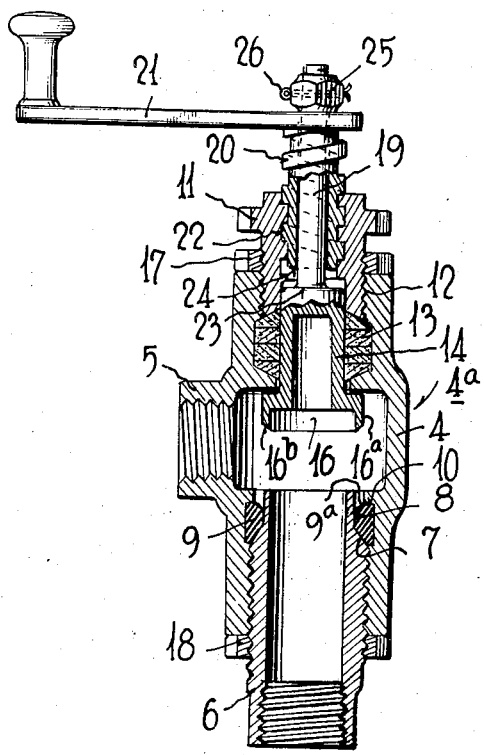
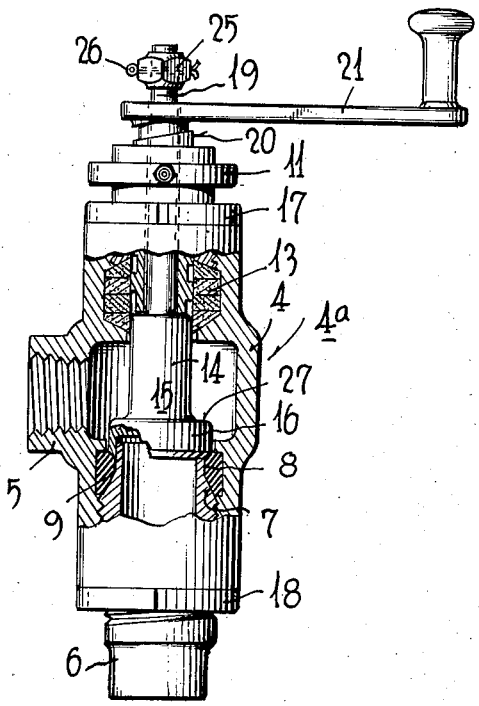
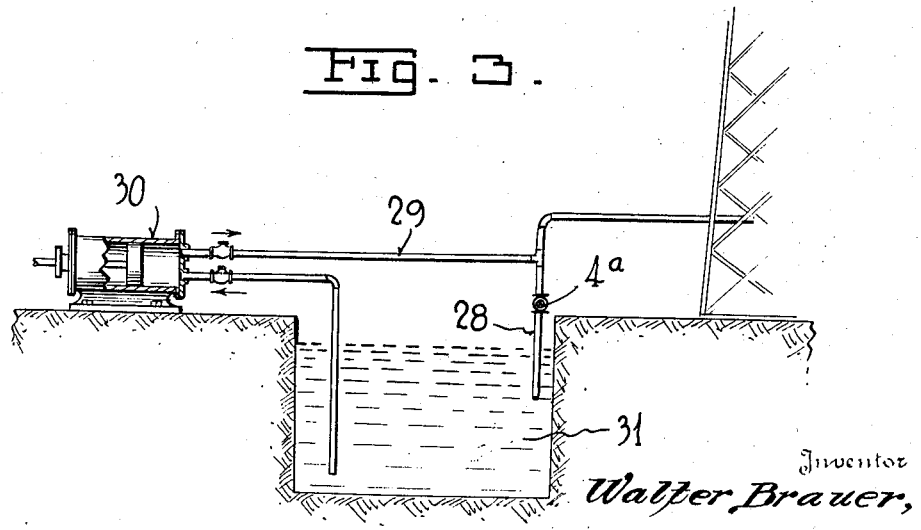
Inventor
Walter Brauer,
By Barry + Cyr
Attorneys Patented Apr. 2, 1940

2,195,764

UNITED STATES PATENT OFFICE 2,195,764

VALVE

Walter Brauer, Oklahoma City, Okla.

Application May 10, 1938, Serial No. 207,091

6 Claims. (Cl. 231—43)

This invention relates to improvements in valves and more particularly to a novel release valve for use on the drain line of slush or mud pumps employed in connection with oil wells.

One of the objects of the invention is to provide a release valve having a heavy screw that opens and shuts the valve and prevents "kicking" against high pressures.

Another object is to supply a release valve having a resilient seat for the plunger serving to seal the threads on a nipple of the valve casing.

A further object is to furnish a release valve having a seat that is readily removable and replaceable by the manipulation of a nipple.

A still further object is to provide a release valve having a packing gland easily adjustable to allow the operating handle to be place in any convenient position when the valve is closed.

With the foregoing objects outlined and with other objects in view which will appear as the description proceeds, the invention consists in the novel features hereinafter described in detail in connection with the accompanying drawing and more particularly pointed out in the appended claims.

In the drawing:

Fig. 1 is a vertical sectional view partly in elevation of my improved valve with the plunger in open position.

Fig. 2 is a similar view with the plunger in closed position.

Fig. 3 is a schematic view illustrating the location of the valve in the drain line of a slush or mud pump.

Referring to the drawing, 4 designates a tubular body having a lateral threaded inlet nipple or port 5.

An outlet nipple 6 is screwed into one end of the tubular body and its inlet end portion is provided with a frusto-conical external surface 7 which merges into a cylindrical surface 8. A packing ring 9 of rubber or other suitable elastic material is clamped in place between the nipple and an internal annular shoulder or flange 10 so that the packing ring is in position to form a resilient valve seat.

A tubular gland 11 is threaded into the opposite end of the body as indicated at 12 and it presses against packing rings 13 which surround the cylindrical portion 14 of a plunger 15, the latter having an enlarged end portion 16 which seats on the ring 9 to prevent flow from the inlet port 5 through the outlet nipple 6. It will be noted from Fig. 1 that the plunger is of hollow formation so as to provide a skirt 16a having a lower beveled edge 16b, the latter being adapted to engage a beveled edge 9a of the seat ring when the plunger is closed. In closed position, the skirt surrounds the upper end of the nipple 6.

Lock nuts 17 and 18 are provided respectively on the gland 11 and nipple 6 to abut against the ends of the body 4 and prevent accidental turning of the parts 11 and 6.

The plunger has a cylindrical stem 19 which is axially slidable in a tubular screw 20 having a handle 21. The screw is relatively heavy or sturdy and has a rather thick coarse thread which engages a corresponding spiral groove 22 in the gland 11; an annular shoulder 23 of the plunger acts as an abutment for the inner end 24 of the screw whereby when the plunger is to be moved into closed position, the lower end of the screw will abut against the shoulder and force the plunger into engagement with the seat 9.

A nut 25 is threaded on to the upper end of the rod 19 and is locked in position by any suitable means such as a cotter pin 26.

Due to the coarse thread, it will be obvious that the plunger may be seated with slight turning movement of the handle 21, and when the plunger is to be unseated, as soon as the handle is turned slightly, the plunger, under the influence of the fluid under pressure passing through the valve, will rise rapidly so as to prevent sand or the like from abrading the valve seat.

With the valve closed as shown in Fig. 2, there is a slight clearance between the handle and the nut 25. This allows the necessary play between the parts, the function of which is to permit the valve to quickly release itself from the seat 9, immediately upon the seal being broken. Consequently the valve may be quickly and easily opened. When closing the valve, the pressure will act on the upper shoulder 27 of the plunger to give it a sudden closing effect, the shock of which will be absorbed by the rubber valve seat.

Such valve is used when it is necessary to repair the drain or discharge lines 28 or 29 (Fig. 3) or when the pump 30 is shut down so that the pressure in the line 29 can be released. Upon starting the pump, the release valve shown at 4a is opened, and the pump fluid passes through the discharge line and drain line into the sump 31. It is necessary that these lines be open in starting the pump, but after it is once started, the valve 4a is closed. In closing the valve by means of the plunger 15, as the latter approaches its seating position, the pressure acts against the upper annular shoulder 27 to cause it to quickly close.

While I have disclosed what I now consider to be a preferred embodiment of the invention in such manner that the same may be readily understood by those skilled in the art, I am aware that changes may be made in the same without departing from the spirit of the invention as expressed in the claims.

What I claim and desire to secure by Letters Patent is:

1. A valve of the character described, comprising a tubular body having an inlet port, an outlet port and a valve seat interposed between the ports, a plunger arranged to reciprocate in the body and having an enlarged end portion adapted to engage the seat for closing communication between the ports, said enlarged end portion when the plunger is in closed position being arranged to receive the pressure of fluid entering through the inlet port for holding the plunger in closed position, said enlarged end portion having a bottom surface which when the plunger is slightly lifted is arranged to be acted upon by the pressure fluid entering the inlet port for rapidly moving the plunger upwardly, packing means in the body embracing the plunger, a packing gland adjustably connected to the body and arranged to compress the packing means, a tubular screw having threaded engagement with said gland and provided with means to permit the operator to turn the screw, a rod projecting from the plunger and extending through the screw, said rod being axially movable in the screw and the latter being rotatable on the rod, means at the outer end of the rod to limit the outward movement of the screw, and abutment means on the plunger adapted to engage the inner end of the screw for holding the plunger in closed position.

2. A release valve comprising a tubular body provided with an upper inlet port, a lower outlet port, and a valve seat interposed between said ports, a plunger arranged to reciprocate in the body and having an enlarged end portion adapted to engage the seat for closing communication between the ports, said enlarged end portion when the plunger is in closed position being arranged to receive the pressure of fluid entering the inlet port for holding the plunger in closed position, the enlarged end portion having a bottom surface which when the plunger is raised slightly is adapted to receive the pressure of fluid entering the inlet port for rapidly moving the plunger upwardly, said plunger having a cylindrical portion extending upwardly from the enlarged end portion, the valve having a substantially annular shoulder positioned between the cylindrical portion and the enlarged end portion, annular packing means in the body surrounding the cylindrical portion of the plunger, a gland having threaded connection with the body and engaging the packing means for compressing the latter, said gland being of tubular formation and having relatively thick internal threads, a tubular screw engaging the threads of the gland and provided with an external handle, said plunger having a projecting rod extending through the screw, the rod being axially movable in the screw and the latter being rotatable about the rod, and means for limiting the axial movement of the rod relatively to the screw.

3. A release valve comprising a tubular body having a bore, the body also having an upper inlet port and a lower outlet port communicating with the bore, a valve seat in the bore arranged below the inlet port, a plunger arranged to reciprocate in the body and having a stem comprising large and small cylindrical portions with a shoulder between them, packing rings arranged in the bore and snugly engaging the large cylindrical portion of the stem, a gland engaging said packing rings and having external threads threadedly engaging said body, said gland having coarse internal threads, a tubular screw having external coarse threads engaging the coarse threads of the gland, said screw having a cylindrical bore surrounding the small cylindrical portion of the stem, one end of the tubular screw being adapted to engage said shoulder for moving the plunger in one direction, a handle fixed to the opposite end of the screw, and an abutment secured to the stem for limiting the movement of the handle and screw in one direction, the plunger having an enlarged lower end portion adapted to cooperate with said seat and provided with upper and lower surfaces adapted to be acted upon by fluid under pressure entering the inlet port for rapidly closing or opening the valve.

4. A valve of the character described, comprising a tubular body provided with an upper inlet port and a lower outlet port, a valve seat arranged in the body between said ports, a plunger in the body having an enlarged end portion cooperating with the seat to shut off communication between said ports, said enlarged portion when the plunger is in closed position being substantially below said inlet port whereby the pressure of incoming fluid acts to maintain the plunger in engagement with the seat, the enlarged end portion having a bottom surface against which the pressure of the fluid is adapted to act to raise the plunger rapidly when the plunger is lifted slightly, a stem rigidly united with the plunger, a tubular screw rotatably and axially slidably mounted on the stem and provided with a handle, means united with the body and having internal threads engaging the threads of the screw, and means for limiting opposite axial movements of the stem relatively to the screw.

5. A valve of the character described, comprising a tubular body provided with an upper inlet port and a lower outlet port, a valve seat arranged in the body between said ports, a plunger in the body having an enlarged end portion cooperating with the seat to shut off communication between said ports, said enlarged portion when the plunger is in closed position being substantially below said inlet port whereby the pressure of incoming fluid acts to maintain the plunger in engagement with the seat, the enlarged end portion having a bottom surface against which the pressure of the fluid is adapted to act to raise the plunger rapidly when the plunger is lifted slightly, a stem rigidly united with the plunger, a tubular screw rotatably and axially slidably mounted on the stem and provided with a handle, means united with the body and having internal threads engaging the threads of the screw, and means for limiting opposite axial movements of the stem relatively to the screw, said threaded means having threaded engagement with the body above said inlet.

6. In a valve of the type having a body provided with a bore, an inlet port and an outlet port communicating with the bore, a valve seat in the bore between said ports, and a plunger arranged to reciprocate in the bore into and out of contact with said seat and shaped to be forced toward said seat by fluid under pressure entering said bore from the inlet port when the valve is closed, and to be forced away from the seat by said fluid when the valve is opened slightly, the improvements, which comprise a stem connected with the plunger, extending in a direction away from said seat and having a cylindrical portion, a tubular screw rotatable and axially slidable on said stem, said screw having coarse external threads, means united with said body and having coarse internal threads engaging the threads of the screw, means arranged externally of said body to facilitate manual turning of the screw, and abutments at the opposite ends of the cylindrical portion of the stem and engageable with the screw for limiting relative axial movement of the screw and stem in opposite directions.

WALTER BRAUER.